United States Patent [19]
Ahiko et al.

[11] Patent Number: 6,104,599
[45] Date of Patent: Aug. 15, 2000

[54] CHIP TYPE LAMINATED CERAMIC CAPACITOR

[75] Inventors: Taisuke Ahiko, Konouramachi; Junichi Musaka, Akita; Hiroki Satoh, Honjoh, all of Japan

[73] Assignee: TDK Corporation, Tokyo, Japan

[21] Appl. No.: 09/044,028

[22] Filed: Mar. 19, 1998

[30] Foreign Application Priority Data

Mar. 19, 1997 [JP] Japan ........................................ 066974

[51] Int. Cl.⁷ .............................. H01G 4/12; H01G 4/30
[52] U.S. Cl. ........................ 361/306.3; 361/311; 361/313
[58] Field of Search ................................ 361/303, 306.1, 361/306.3, 307, 308.1, 309, 310, 311–313, 321.1, 321.2, 321.3, 321.4, 321.5; 29/25.42, 25.41

[56] References Cited

U.S. PATENT DOCUMENTS 4,756,928 7/1988 Senda et al. .............................. 427/77

FOREIGN PATENT DOCUMENTS

| 62-044519 | 11/1987 | Japan . |
| 63-014456 | 4/1988 | Japan . |
| 4-092624 | 8/1992 | Japan . |
| 6-163311 | 6/1994 | Japan . |
| 7-032936 | 6/1995 | Japan . |
| 8-001875 | 1/1996 | Japan . |
| 8-181033 | 7/1996 | Japan . |

*Primary Examiner*—Kristine Kincaid
*Assistant Examiner*—Eric Thomas
*Attorney, Agent, or Firm*—Oblon, Spivak, McClelland, Maier & Neustadt, P.C.

[57] ABSTRACT

Internal electrodes 21 to 27 overlap one another in the direction of thickness T via dielectric ceramic layers 10 inside a dielectric ceramic body 1, with alternate ends of adjacent internal electrodes connected to the pair of external terminal electrodes 31 and 32 at alternate sides in the lengthwise direction L. The ends of the internal electrodes 21 to 27 at the other side in the lengthwise direction L extend into the areas enclosed by the external terminal electrodes 31 and 32, with the two corner portions of each internal electrode at the opposite side in the widthwise direction W cut off. The corner portions are cut off to ensure that corner portion areas of the internal electrodes that would otherwise be contained within a triangular area S11 formed by the shortest hypothetical line X11 connecting the middle point of the external terminal electrode 31 viewed in the widthwise direction W and a front end 321 of the external terminal electrode 32 viewed in the lengthwise direction L, one surface in the widthwise direction W and one surface in the lengthwise direction L of the dielectric ceramic body 1 are removed.

2 Claims, 3 Drawing Sheets

6,104,599

CHIP TYPE LAMINATED CERAMIC CAPACITOR

BACKGROUND OF THE INVENTION

1. Field of the Invention

The present invention relates to a compact and large capacity chip type laminated ceramic capacitor and a method for mounting it.

2. Discussion of Background

Laminated ceramic capacitors in the prior art are designed to ensure that the internal electrodes overlap over the largest possible area in order to achieve a larger electrostatic capacity within a limited volume.

Laminated ceramic capacitors in the known art are mounted in such a manner that the internal electrodes are placed parallel to the circuit pattern surface of a printed board or the like to assure sufficient stability (see Japanese Unexamined Patent Publication No. 181033/1996, for instance). However, the printed board becomes thermally expanded and distorted due to heat applied during soldering and the like. During the cooling cycle after the soldering is completed, on the other hand, the printed board undergoes thermal contraction and becomes distorted. Such a distortion may result in cracks forming in the dielectric ceramic body. If there is a crack formed in the dielectric ceramic body, the internal electrodes may become cracked, disconnected or the like. Thus, there is a concern in regard to this mounting method that the electrostatic capacity of the laminated ceramic capacitor may degrade, reducing the insulation resistance.

As a means for lessening the thermal distortion occurring during soldering, laminated ceramic capacitors that feature a structure in which the corners of the front end sides of the internal electrodes are formed in an arc have been proposed (see Japanese Examined Patent Publication No. 1875/1996, Japanese Examined Utility Model Publication No. 14456/1988, Japanese Unexamined Patent Publication No. 181033/1996 and Japanese Unexamined Utility Model Publication No. 92624/1992, for instance).

While this type of laminated ceramic capacitor is effective to a certain degree in reducing the residual stress caused by thermal shock during soldering and preventing degradation of performance caused by cracks, it does not completely eliminate the problem discussed above. Furthermore, since the area over which the internal electrodes overlap is reduced, another problem arises in that the electrostatic capacity that can be achieved is greatly reduced.

SUMMARY OF THE INVENTION

It is an object of the present invention to provide a laminated ceramic capacitor that is capable of achieving a large electrostatic capacity.

It is a further object of the present invention to provide a laminated ceramic capacitor in which degradation of characteristics caused by cracks that may be formed in the dielectric ceramic body can be prevented.

It is a still further object of the present invention to provide a laminated ceramic capacitor in which degradation of characteristics caused by cracks can be prevented while minimizing any reduction in capacity.

In order to achieve the objects described above, the laminated ceramic capacitor according to the present invention comprises a dielectric ceramic body, a plurality of internal electrodes and at least one pair of external terminal electrodes. The dielectric ceramic body is a hexahedron having a thicknesswise direction, a widthwise direction and a lengthwise direction. The pair of external terminal electrodes are provided at the two ends of the dielectric ceramic body in the lengthwise direction, covering one surface in the lengthwise direction, two surfaces in the thicknesswise direction and two surfaces in the widthwise direction, of the dielectric ceramic body.

The plurality of internal electrodes that are embedded inside the dielectric ceramic body overlap one another in the thicknesswise direction via dielectric ceramic layers, with alternate ends of adjacent internal electrodes connected to the pair of external terminal electrodes at alternate sides in the lengthwise direction with the other ends of the internal electrodes extending into areas enclosed by the external terminal electrodes with the two corner portions of each in the widthwise direction cut off.

The two corner portions of each of the internal electrodes are cut off to ensure that they will not be contained within the triangular areas formed by the shortest hypothetical lines connecting the middle point of the external terminal electrode viewed in the widthwise direction and the front ends of the external terminal electrode viewed in the lengthwise direction, one surface of the dielectric ceramic body in the widthwise direction and one surface of the dielectric ceramic body in the lengthwise direction.

In the laminated ceramic capacitor according to the present invention, since a pair of external terminal electrodes are provided at the two ends in the lengthwise direction of the hexahedron-shaped dielectric ceramic body and a plurality of internal electrodes are embedded inside the dielectric ceramic body overlapping one another in the thicknesswise direction via dielectric ceramic layers with alternate ends of adjacent internal electrodes connected to the pair of external terminal electrodes at alternate sides in the lengthwise direction, a large electrostatic capacity is achieved between the pair of external terminal electrodes, which is in proportion to the total number of internal electrodes, the area over which the electrodes face opposite one another, the dielectric constant of the dielectric ceramic layers, their thickness and the like.

Since the external terminal electrodes cover one surface in the lengthwise direction, two surfaces in the thicknesswise direction and two surfaces in the widthwise direction of the dielectric ceramic body, the external terminal electrodes are made to adhere to the dielectric ceramic body over a total of 5 surfaces, greatly increasing the strength in which the external terminal electrodes adhere.

Since the ends of the plurality of internal electrodes at alternate sides in the lengthwise direction extend into the areas enclosed by the external terminal electrodes, it is possible to achieve a large electrostatic capacity by making the best use of the length and the width of the dielectric ceramic body.

The corner portions in the widthwise direction of the ends of the internal electrodes at the opposite side in the lengthwise direction are cut off. These corners at the ends of the internal electrodes at the opposite side are cut off to ensure that they will not be contained within the triangular areas formed by the shortest hypothetical lines connecting the middle point of the external terminal electrode viewed in the widthwise direction and the front ends of the external terminal electrodes viewed in the lengthwise direction, one surface in the widthwise direction and one surface in the lengthwise direction of the dielectric ceramic body. With such a structure effected through cutting, when the laminated ceramic capacitor is positioned by placing one surface in the widthwise direction facing opposite the surface of the board on which parts are mounted to solder it to the conductive pattern provided on the board, the area over which solder is applied becomes smaller compared to the triangular area described earlier under normal circumstances.

Cracks caused by thermal expansion and thermal contraction of the printed board mainly occur in the area where the solder is applied. As explained above, this area over which the solder is applied is contained within the triangular area achieved by cutting the ends of the internal electrodes at the opposite side in the lengthwise direction where the internal electrodes do not overlap each other anywhere, and thus, this area is essentially irrelevant to achieving capacity. Because of this, even if cracks occur in the area where the solder is applied to cause cracking and partial disconnection in other internal electrodes facing opposite the internal electrodes whose corner portions are cut off, no degradation in the characteristics such as a reduction in capacity will result.

Since the internal electrodes are each cut off at the two corner portions in the widthwise direction, no degradation of characteristics caused by cracks will result in the widthwise direction, regardless of the direction of installation.

Furthermore, the internal electrodes, with their ends at the other side in the lengthwise direction extending to the areas enclosed by the external terminal electrodes, achieve a structure that allows the maximum use of the length and the width of the dielectric ceramic body. Since the two corner portions in the widthwise direction of the internal electrodes at the end at the other side in the lengthwise direction are cut off in combination with this structural feature, any reduction in the capacity that may occur due to the cutting can be minimized, to prevent degradation in the characteristics due to cracks.

BRIEF DESCRIPTION OF THE DRAWINGS

Other objects, structural features and advantages of the present invention are explained in further detail by referring to the attached drawings that illustrate preferred embodiments.

DETAILED DESCRIPTION OF THE PREFERRED EMBODIMENTS

Figure 1:
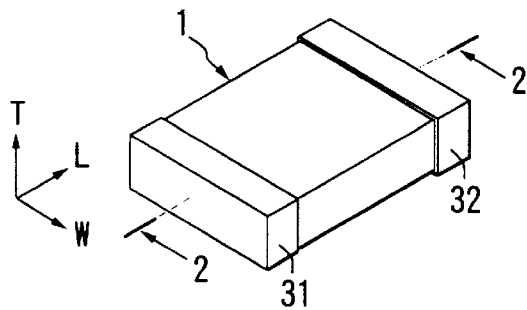
FIG. 1 is a perspective illustrating the laminated ceramic capacitor according to the present invention
Figure 2:
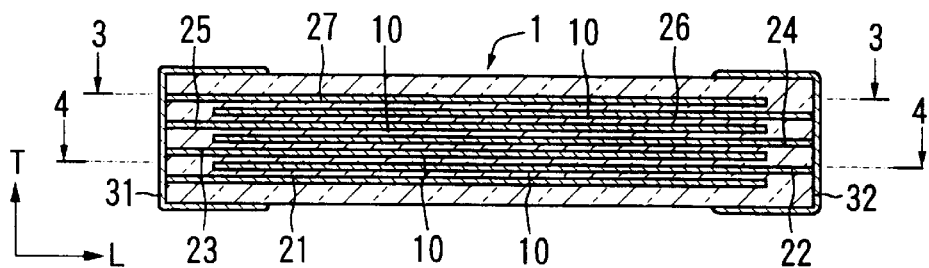
FIG. 2 is a cross section through line 2—2 in FIG. 1.

Referring to FIGS. 1 to 4, the laminated ceramic capacitor according to the present invention includes a dielectric ceramic body 1, a plurality of internal electrodes 21 to 27 and a pair of external terminal electrodes 31 and 32. The dielectric ceramic body 1 is formed in a hexahedron shape having a thicknesswise direction T, a widthwise direction W and a lengthwise direction L. The pair of external terminal electrodes 31 and 32, which are provided at the two ends of the dielectric ceramic body 1 in the lengthwise direction L, each cover one surface in the lengthwise direction L, two surfaces in the thicknesswise direction T and two surfaces in the widthwise direction W, of the dielectric ceramic body 1.

The plurality of internal electrodes 21 to 27 are embedded inside the dielectric ceramic body 1 and overlap one another in the thicknesswise direction T via dielectric ceramic layers 10, with alternate ends of adjacent internal electrodes connected to the pair of external terminal electrodes 31 and 32 at alternate sides in the lengthwise direction L. For instance, one end of the internal electrode 21 is connected to the external terminal electrode 31, and one end of the internal electrode 22 adjacent to the internal electrode 21 is connected to the external terminal electrode 32. The ends of the internal electrodes 21, 23, 25 and 27 at the other side in the lengthwise direction L extend into the areas enclosed by the external terminal electrodes 31 and 32, with the two corner portions in the widthwise direction W of each of them cut off. The number of internal electrodes 21 to 27 to be provided is arbitrary.

Figure 3:
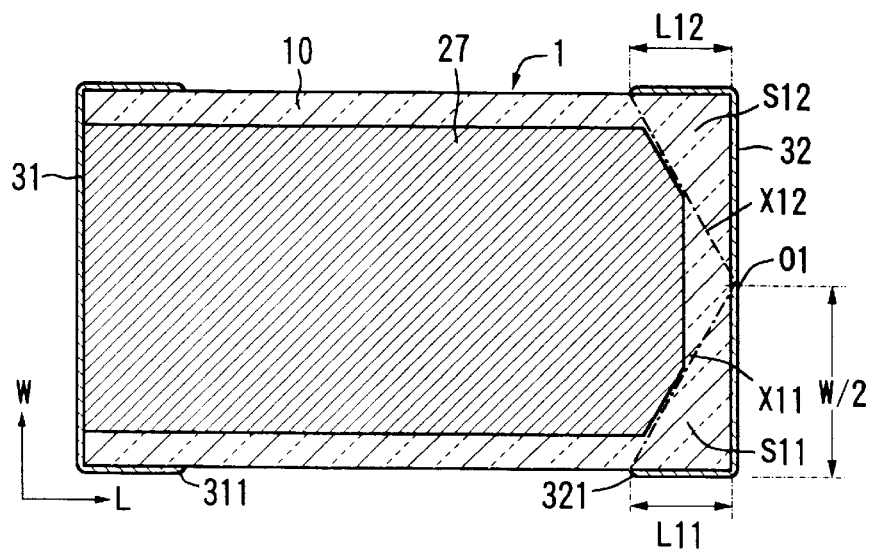
FIG. 3 is a cross section through line 3—3 in FIG. 2.

As illustrated in FIG. 3, the two corner portions in each of the internal electrodes 21, 23, 25 and 27 that are connected to the external terminal electrode 31 at their ends at one side are cut off to ensure that they will not be enclosed within triangular areas S11 and S12. The triangular area S11 is formed by the shortest hypothetical line X11 connecting the middle point O1 of the external terminal electrode 32 viewed in the widthwise direction W and the front end 321 of the external terminal electrode 32 viewed in the lengthwise direction L, one surface in the widthwise direction W and one surface in the lengthwise direction L of the dielectric ceramic body 1. With the length of the external terminal electrode 32 to the front end portion 321 set at L11, the triangular area S11 is formed as a right triangle constituted of the length L11, the height (width) W/2 and a hypotenuse X11. The height (width) W/2 is larger than the length L11 of the external terminal electrode 31.

The triangular area S12 is formed by the shortest hypothetical line X12 connecting the middle point O1 of the external terminal electrode 32 viewed in the widthwise direction W and the front end 321 of the external terminal electrode 32 viewed in the lengthwise direction L, one surface in the widthwise direction W and one surface in the lengthwise direction L of the dielectric ceramic body 1, at the opposite side from the triangular area S11.

With the length of the external terminal electrode 32 to the front end portion 321 set at L12 (=L11), the triangular area S12 is formed as a right triangle constituted of the length L12, the height (width) W/2 and a hypotenuse X12. The height (width) W/2 is larger than the length L12 of the external terminal electrode 31.

Figure 4:
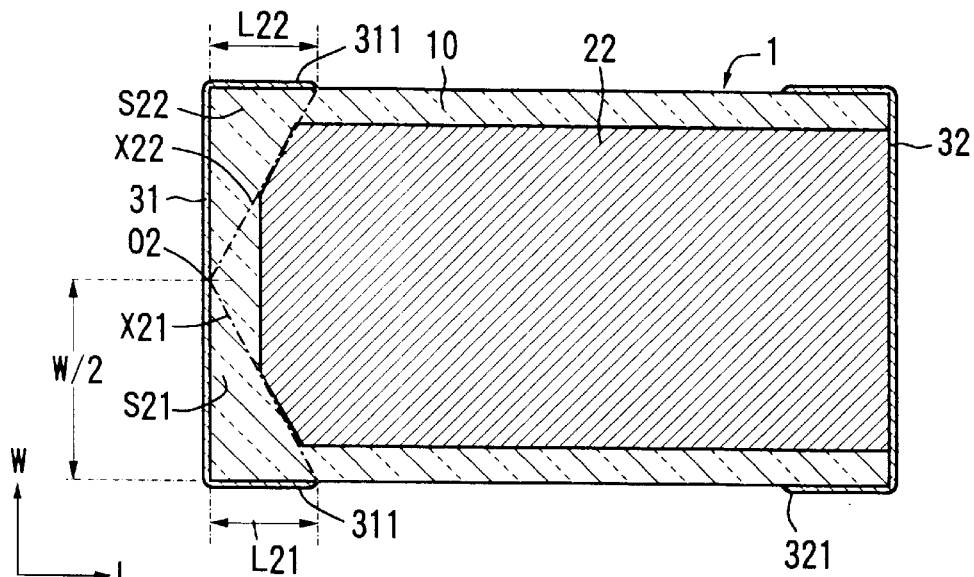
FIG. 4 is a cross section through line 4—4 in FIG. 2.

As illustrated in FIG. 4, the two corner portions in each of the internal electrodes 22, 24, and 26 that are connected to the external terminal electrode 32 at their ends at one side are cut off to ensure that they will not be enclosed within triangular areas S21 and S22. The triangular area S21 is formed by the shortest hypothetical line X21 connecting the middle point O2 of the external terminal electrode 31 viewed in the widthwise direction W and the front end 311 of the external terminal electrode 31 viewed in the lengthwise direction L, one surface in the widthwise direction W and one surface in the lengthwise direction L of the dielectric ceramic body 1. With the length of the external terminal electrode 31 to the front end portion 311 set at L21, the triangular area S21 is formed as a right triangle constituted of the length L21, the height (width) W/2 and a hypotenuse X21. The height (width) W/2 is larger than the length L21 of the external terminal electrode 31.

The triangular area S22 is formed by the shortest hypothetical line X22 connecting the middle point O2 of the external terminal electrode 31 viewed in the widthwise direction W and the front end 311 of the external terminal electrode 31 viewed in the lengthwise direction L, one surface in the widthwise direction W and one surface in the lengthwise direction L of the dielectric ceramic body 1, at the opposite side from the triangular area S21.

With the length of the external terminal electrode 31 to the front end portion 311 set at L22 (=L21), the triangular area S22 is formed as a right triangle constituted of the length L22, the height (width) W/2 and a hypotenuse X22. The height (width) W/2 is larger than the length L22 of the external terminal electrode 31.

As has been explained, in the laminated ceramic capacitor according to the present invention, since the pair of external-terminal electrodes 31 and 32 are provided at the two ends in the lengthwise direction of the hexahedron-shaped dielectric ceramic body 1 and a plurality of internal electrodes 21 to 27 are embedded inside the dielectric ceramic body 1 overlapping one another in the thicknesswise direction T via the dielectric ceramic layers 10 with alternate ends of adjacent internal electrodes at alternate sides in the lengthwise direction L connected to the pair of external terminal electrodes 31 and 32, a large electrostatic capacity is achieved between the pair of external terminal electrodes 31 and 32, which in proportion to the total number of internal electrodes 21 to 27, the area over which the electrodes face opposite one another, the dielectric constant of the dielectric ceramic layers 10, their thickness and the like.

Since the external terminal electrodes 31 and 32 cover one surface in the lengthwise direction L, two surfaces in the thicknesswise direction T and two surfaces in the widthwise direction W of the dielectric ceramic body 1, the external terminal electrodes 31 and 32 are made to adhere to the dielectric ceramic body 1 over a total of 5 surfaces, greatly increasing the strength in which the external terminal electrodes 31 and 32 adhere.

Since the ends of the plurality of internal electrodes 21 to 27 at the other side in the lengthwise direction L extend into the areas enclosed by the external terminal electrodes 31 and 32, it is possible to achieve a large electrostatic capacity by making the best use of the length L and the width W of the dielectric ceramic body 1.

Figure 5:
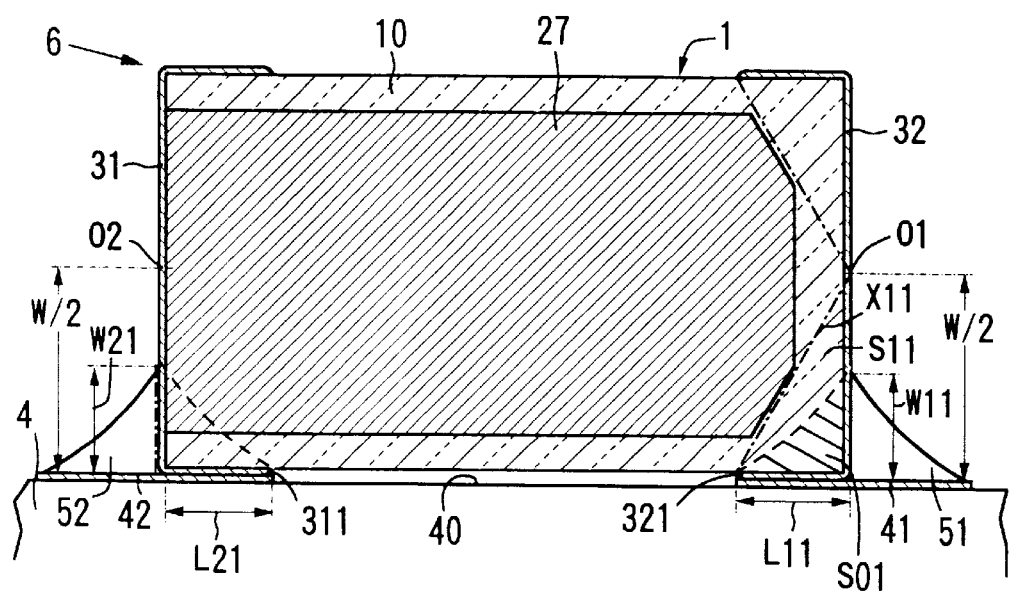
FIG. 5 is a cross section illustrating a method for mounting the laminated ceramic capacitor according to the present invention.

FIG. 5 is a cross section illustrating the method for mounting the laminated ceramic capacitor according to the present invention. As shown in the figure, when mounting a laminated ceramic capacitor 6 according to the present invention, it is positioned so that one surface in the lengthwise direction W faces opposite a surface 40 of a board 4, upon which parts are to be mounted and secured to conductive patterns 41 and 42 provided on the board 4 with solderings 51 and 52. First, the relationship between the application of the solder 51 and the internal electrodes 21, 23, 25 and 27 is explained.

The solder 51 is, under normal circumstances, applied to achieve a height W11, which is approximately equal to the length L11 of the external terminal electrode 32 adhered at one surface of the dielectric ceramic body 1, in the heightwise direction that is taken in the widthwise direction W of the dielectric ceramic body 1. Since the middle point O1 of the external terminal electrode 32 in the widthwise direction W is larger than the length L11, the solder 51 is applied at the height W11 which is lower than the middle point O1 in the widthwise direction W.

As explained earlier, in the laminated ceramic capacitor 6 according to the present invention, the two corner portions of each of the internal electrodes 21, 23, 25 and 27 connected to the external terminal electrode 31 at its end at one side are cut off to ensure that they are not placed within the triangular area S11.

The triangular area S11, which is formed by the shortest hypothetical line X11 connecting the middle point O1 of the external terminal electrode 32 viewed in the widthwise direction W and the front end 321 of the external terminal electrode 32 viewed in the lengthwise direction L, one surface in the widthwise direction W and one surface in the lengthwise direction L of the dielectric ceramic body 1, is always larger than the solder application area SO1, formed at the height W11 which is lower than the middle point O1 in the widthwise direction W. As a result, the internal electrodes 21, 23, 25 and 27 are not present under the solder application area SO1.

Cracks caused by thermal expansion and thermal contraction of the printed board 4 mainly occur in the solder application area SO1. As explained above, this solder application area SO1 is contained within the triangular area S11 achieved by cutting the ends of the internal electrodes 21, 23, 25 and 27 at the other side in the lengthwise direction where each of the internal electrodes 21 to 27 do not overlap each other anywhere, and thus, this area is essentially irrelevant to achieving capacitance. Because of this, even if cracks occur in the solder application area SO1 to cause cracking and partial disconnection in the internal electrode 22 which faces opposite the internal electrode 21 whose corner portions are cut off, for instance, no degradation in the characteristics such as a reduction in capacity results. It is to be noted that no cracking or partial disconnection occurs in a state in which the internal electrode 22 is broken.

Since the corners of the internal electrodes 21, 23, 25 and 27 are cut off at the two sides in the widthwise direction W and the triangular area S12 is present symmetrically relative to the triangular area S11, identical advantages are achieved regardless of which of the two surfaces facing opposite each other in the widthwise direction W is placed facing opposite the part mounting surface 40 at the board 4.

Figure 6:
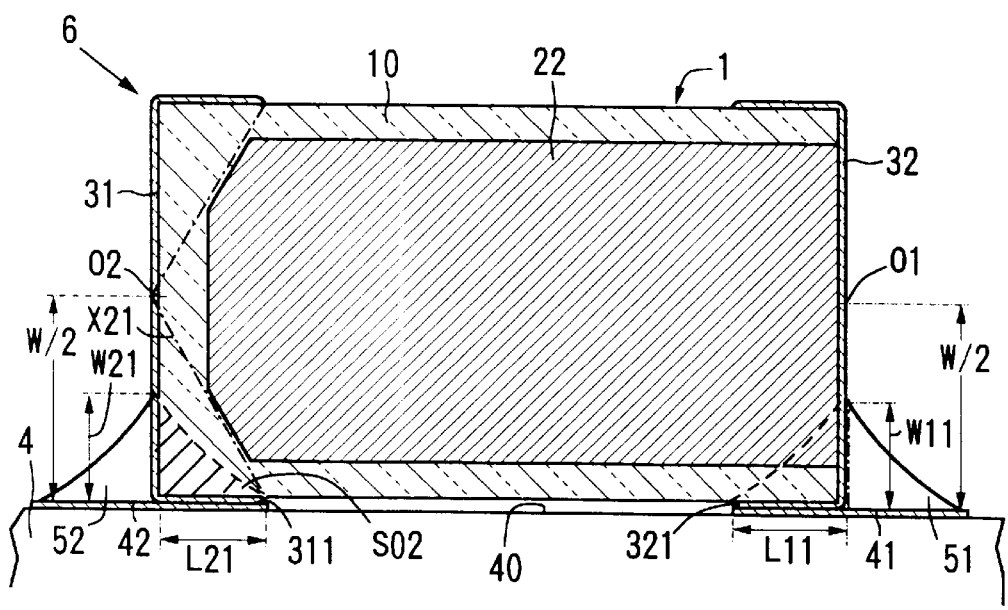
FIG. 6 is a cross section illustrating a method for mounting the laminated ceramic capacitor according to the present invention.

Next, in reference to FIG. 6, the relationship between the area over which the solder 52 is applied and the internal electrodes 22, 24 and 26 is explained. The solder 52 is, under normal circumstances, applied to achieve a height W21, which is approximately equal to the length L21 of the external terminal electrode 31 adhered at one surface of the dielectric ceramic body 1, in the heightwise direction that is taken in the widthwise direction W of the dielectric ceramic body 1. Since the middle point O2 of the external terminal electrode 31 in the widthwise direction W is larger than the length L21, the solder 52 is applied at the height W21 which is lower than the middle point O2 in the widthwise direction W.

The two corner portions of each of the internal electrodes 22, 24, 26 that are connected to the external terminal electrode 32 at their ends at one side are cut off to ensure that they are not placed within the triangular area S21.

The triangular area S21, which is formed by the shortest hypothetical line X21 connecting the middle point O2 of the external terminal electrode 31 viewed in the widthwise direction W and the front end 311 of the external terminal electrode 31 viewed in the lengthwise direction L, one surface in the widthwise direction W and one surface in the lengthwise direction L of the dielectric ceramic body 1, is always larger than the solder application area S02, formed at the height W21 which is lower than the middle point O2 in the widthwise direction W. As a result, the internal electrodes 22, 24, 26 are not present under the solder application area S02.

Cracks caused by thermal expansion and thermal contraction of the printed board 4 mainly occur in the solder application area S02. As explained above, this solder application area S02 is contained within the triangular area S21 achieved by cutting the ends of the internal electrodes 22, 24, 26 at the other side in the lengthwise direction where each of the internal electrodes 21 to 27 do not overlap each other anywhere, and thus, this area is essentially irrelevant to achieving capacitance. Because of this, even if cracks occur in the solder application area S02 in the dielectric ceramic body 1 to cause cracking and partial disconnection in the internal electrode 21 which faces opposite the internal electrode 22 whose corner portions are cut off, for instance, no degradation in the characteristics such as a reduction in capacity results.

Since the corners of the internal electrodes 22, 24, 26 are cut off at the two sides in the widthwise direction W and the triangular area S22 is present symmetrically relative to the triangular area S21, identical advantages are achieved regardless of which of the two surfaces facing opposite each other in the widthwise direction W is placed facing opposite the part mounting surface 40 at the board 4.

Furthermore, the internal electrodes 21 to 27, with their ends at the other side in the lengthwise direction L extending to the areas enclosed by the external terminal electrodes 31 and 32, achieve a structure that allows the maximum use of the length L and the width W of the dielectric ceramic body 1. Since the two corner portions in the widthwise direction W of each of the internal electrodes 21 to 27 at its end at the other side in the lengthwise direction L are cut off in combination with this structural feature, any reduction in the capacity that may occur due to the cutting can be minimized, to prevent degradation in the characteristics due to cracks.

Now, the method for manufacturing the laminated ceramic capacitor and characteristics data that are achieved through different methods of mounting the resulting laminated ceramic capacitor are explained. First, a granulated sub-constituent is added to the main constituent material constituted of BaTiO whose maximum average particle size is 2 μm at a ratio of 3 wt %. Then, with an organic binder and a plasticizer added, a mixture is thoroughly blended in a bowl mill. After this, it is made into a slurry, and a dielectric ceramic green sheet is obtained through the doctor blade method.

Next, on one surface of the green sheet thus obtained, an internal electrode pattern having a plurality of internal electrodes with corner portions at the front end sides of the internal electrodes cut off to achieve a smaller width for the internal electrodes starting from the area that is larger than the hanging portions of the external terminal electrodes is printed.

Then, dried green sheets are laminated and pressed in the direction of the thickness of the sheets. The laminated assembly is then cut to achieve a laminated body for a laminated ceramic capacitor.

Then, this laminated body is air dried at 320° C. for five hours to remove the binder. After this, it is baked at 1250° C. for two hours in reduced gas flow to obtain a sintered body.

Finally, a conductive paste is applied to the two end portions of the sintered body and baking is performed to form the external terminal electrodes. Thus, a laminated ceramic capacitor having an electrostatic capacity of approximately 1 μF is achieved.

Now, the results of comparison of the electrostatic capacity change rate and the insulation resistance in the laminated ceramic capacitor using four different test pieces with varying electrode states and soldering modes are presented in Table 1. In the table, the test piece in Example for Comparison 1 is achieved by performing soldering so that the internal electrodes are positioned parallel to the circuit pattern surface, the test piece in Example for Comparison 2 is achieved by performing soldering so that the internal electrodes are positioned perpendicular to the circuit pattern surface, the test piece in Example for Comparison 3 is achieved by performing soldering so that the internal electrodes with their corner portions at one end cut off, are placed parallel to the circuit pattern surface and the test piece in Embodiment 1 is achieved by performing soldering so that the internal electrodes, with their corner portions at one end cut off, are placed perpendicular to the circuit pattern surface.

TABLE I

| Test piece | Electrode state | Soldering mode | Electrostatic capacity change rate (%) | Insulation resistance (Ω) |
|---|---|---|---|---|
| Example for Comparison 1 | Prior art electrodes | Horizontal | −60 | $10^{-10}$ or less |
| Example for Comparison 2 | Prior art electrodes | Vertical | −5 | $10^{-10}$ or less |
| Example for Comparison 3 | Electrodes cut at ends | Horizontal | −60 | $10^{-10}$ or less |
| Embodiment 1 | Electrodes cut at ends | Vertical | 0 | $10^{-10}$ or more |

In regard to the electrostatic capacity, the data in Table 1 indicates that while a degradation of 60% is observed after soldering in Examples for Comparison 1 and 3 and a degradation of 5% is observed in Example for Comparison 2, no degradation is observed in Embodiment 1. As for the insulation resistance, while the figures for Examples for Comparison 1, 2 and 3 is 10Ω or less, Embodiment 1 achieves a clearly higher resistance value than the other test pieces at 10Ω or more. Thus, in the embodiment of the present invention, no degradation in the electrostatic capacity or no reduction in the insulation resistance is observed.

As has been explained, according to the present invention, the following advantages are achieved.

(a) A laminated ceramic capacitor capable of achieving a large electrostatic capacity is provided.

(b) A laminated ceramic capacitor in which degradation of characteristics caused by cracks that may be formed in the dielectric ceramic body is prevented is provided.

(c) A laminated ceramic capacitor in which the degradation of characteristics due to cracks is prevented while minimizing the reduction in capacity is provided.

What is claimed is:

1. A laminated ceramic capacitor comprising:
   a dielectric ceramic body formed in a hexahedron shape having a thicknesswise direction, a widthwise direction and a lengthwise direction;
   at least two external terminal electrodes, each external terminal electrode covering one of two opposite end surfaces of said dielectric ceramic body spaced apart by four main surfaces extending in said lengthwise direction, wherein each of the four main surfaces has two longitudinal edges extending in said lengthwise direction with two of the four main surfaces being widthwise main surfaces having two other edges extending in the widthwise direction and two others of the four main surfaces being thicknesswise main surfaces having two other edges extending in the thicknesswise direction and further wherein a widthwise portion of each of the external terminal electrodes extends onto a portion of the two widthwise main surfaces and a thicknesswise portion of each of the external terminal electrodes extends onto a portion of the two different thicknesswise main surfaces; and a plurality of internal electrodes embedded inside said dielectric ceramic body overlapping one another as viewed from said thicknesswise direction, adjacent ones of said plurality of internal electrodes being separated from one another in said thicknesswise direction by intervening dielectric ceramic layers, with alternate ends of the adjacent internal electrodes being connected to said at least two external terminal electrodes at alternate ones of said two opposite end surfaces, each one of said internal electrodes having two sides extending in the lengthwise direction and two other sides extending in the widthwise direction, each one of said connected internal electrodes having an unconnected opposite end central portion extending in the lengthwise direction to an area enclosed by one of said external electrodes with two corner portions cut off from the central portion to form one of the sides extending in the widthwise direction that includes two tapered side portions extending from said central portion to each of the two sides extending in the lengthwise direction, wherein:

said two tapered side portions of each of said internal electrodes are shaped to ensure that each of said internal electrodes has no portions contained within a triangular area formed by the shortest hypothetical line connecting the middle point of one of said external electrodes on an edge of each opposite end surface corresponding to one of the sides of a widthwise main surface and an end of said external terminal electrode on each of the two thicknesswise main surfaces said tapered sides being parallel to said shortest hypothetical lines.

2. A laminated ceramic capacitor according to claim 1, wherein:

a distance from a point on either of said sides extending in said widthwise direction of said widthwise main surfaces corresponding to where the tapered side portions begin to said middle point of said external terminal electrode is larger than the length of a corresponding external terminal electrode portion on each thicknesswise main surface extending in said lengthwise direction.

* * * * *